March 22, 1966  E. McEWAN DAKIN ETAL  3,242,276
ELECTRIC SWITCHGEAR
Filed July 15, 1963
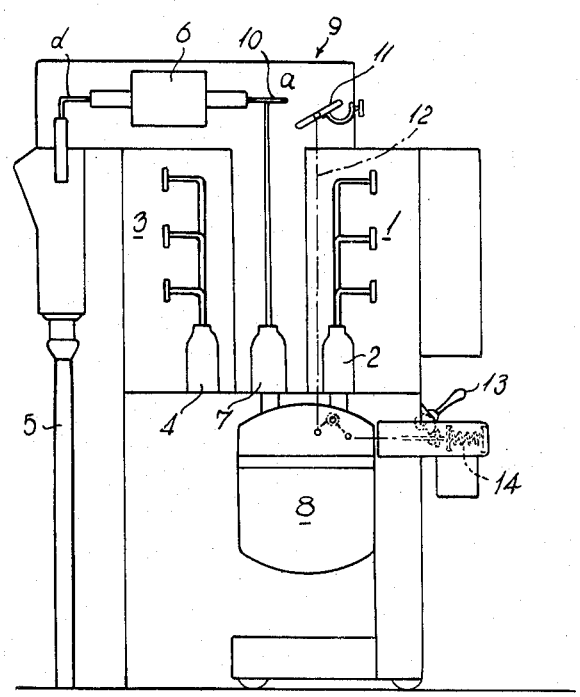
INVENTORS
ERIC McEWAN DAKIN
ROY WILFRED BLOWER
By: Norris & Bateman
attys 3,242,276
ELECTRIC SWITCHGEAR
Eric McEwan Dakin, Ashton-under-Lyne, and Roy Wilfred Blower, New Moston, Manchester, England, assignors to Associated Electrical Industries Limited, London England, a company of Great Britain
Filed July 15, 1963, Ser. No. 294,883
Claims priority, application Great Britain, July 17, 1962, 27,419/62
3 Claims. (Cl. 200—50)

This invention relates to metal-clad switchgear including feeder and busbar lines, also a retractable circuit breaker for their interconnection and disconnection. It aims at an improvement, providing an earthing means which is space saving, safe and simple.

Accordingly the present invention resides in a switchgear arrangement comprising at least one feeder line and at least one busbar line, a circuit breaker for their interconnection and disconnection, also comprising a switch which when closed connects one of said lines to earth, said switch being capable of closing fully and safely and capable of carrying for a limited period, the shirt-circuit current which would flow if the connected line is energised at the instant of operation, a metal enclosure for said lines and switch, and an actuating member controlling the switch operation, said member and said circuit breaker being positioned externally of said enclosure.

If the earth switch is closed on to the feeder line end, for instance, whilst said feeder is energised, a three-phase to earth fault is created, and short circuit current flows through the switch. It is therefore essential that this switch be adequately rated, i.e., designed to close fully and safely under this condition, and that it be designed and proportioned to carry the said short circuit currents without damage, for a sufficient time, say three seconds. In order to ensure safe closing under the fault or energised conditions, the said mechanical connection between the actuating member and the switch advantageously contains a mechanical energy storage means, which closes the switch in a suitable operational fashion independent of the manner in which the actuating member is operated.

In a preferred embodiment the enclosure also accommodates a current transformer coupled to a conductor leading to the feeder line end, and the mechanism includes the energy storing device, such as a spring.

More details will become apparent and the invention will be better understood from the single figure of the accompanying drawing which shows diagrammatically and by way of example a preferred embodiment of the invention.

Two groups 1, 3 of three-phase busbars have insulated "spout" connector ends 2, 4. A feeder line comprises a cable 5 connected through a gland to a rigid conductor *d* a portion of which is coupled to a current transformer 6. A horizontal portion of the conductor *d* is joined to a vertical conductor portion ending in an insulated spout connector 7. A retractable circuit breaker unit 8 is provided for connecting the feeder line alternatively to one or the other of the busbar groups 1, 3, or to isolate the feeder line, as is known in the art. A projection *a* of a horizontal portion 10 of the rigid conductor *d* forms a stationary contact cooperating with a movable contact 11, which in the present case is of the blade or knife type, and is connected conductively to an earthed metal enclosure 9. The busbar groups 1, 3, rigid conductor *d*, current transformer 6 and earthing switch 11, are all accommodated in the enclosure 9. An operating handle 13, situated outside the enclosure 9, is mechanically connected to the switch 11 through a mechanism 12, a portion of which is also accommodated in the enclosure 9. The switch is designed to close fully and safely, the contact 11 engaging the fixed contact 10, even if the feeder line 5 be energised, and a three-phase to earth short circuit thereby be caused. The switch also is capable of carrying such short circuit currents for a short period as necessary, say three seconds. To achieve safe and consistent closing performance even under the aforesaid short circuit conditions, the mechanism 12 includes a power storage means, as is known in the art, such as a spring 14, as shown very diagrammatically, which is tensioned or compressed to a predetermined degree during an initial period of the handle movement, and is released toward the end of that movement to ensure rapid and consistent switch closure independent of the speed or acceleration of the actual handle movement.

An interlocking mechanism, known per se and not shown, can be provided to ensure that in this case the earthing switch cannot be closed while the line is connected through the circuit breaker to one or the other of the two busbar groups 1, 3.

While a preferred embodiment has been shown, it will be understood that modifications are possible without departing from the invention as defined by the appended claims. The switch may be of any suitable type known in the art, and may be designed for straight contact movement, such as known with "tulip" contacts. The earthing switch 11 could be arranged on the other side of the current transformer 6 to engage a contact piece provided on the conductor *d* between the transformer 6 and cable 5. If an interlocking means as mentioned before is not provided and the switch 11 is closed while the circuit breaker connects in the position shown, fault conditions can be created for the busbar and feeder lines. Alternatively a separate fault making earthing switch according to the invention can be provided for the busbars.

What we claim is:
1. An electric switchgear comprising a stationary support, a grounded metal enclosure on said support, isolating contacts on said enclosure connected respectively to a supply network and a consuming circuit, a trippable circuit breaker unit having external terminals and being movably mounted on said support externally of said enclosure to allow engagement and disengagement between said contacts and terminals, a stationary conductor mounted in said enclosure connected between one of said isolating contacts and the consuming circuit, switching means for grounding said conductor mounted in said enclosure, means for closing said switching means, said switching means being capable of connecting and carrying for limited periods heavy grounding current resulting from the consuming circuit being energized through said circuit breaker from said network, said periods exceeding the tripping delay of the circuit breaker unit, and means on said support accessible externally of said enclosure mechanically connected to operate said switching means.

2. In the electric switchgear defined in claim 1, said switch operating means comprising energy storing and reclosing means having a manual operating member externally of said enclosure.

3. In the electric switchgear defined in claim 2, said energy storing and releasing means comprising spring means that is energized and then released by switch closing movement of said operating member.

References Cited by the Examiner

UNITED STATES PATENTS

| | | | |
|---|---|---|---|
| 1,872,298 | 8/1932 | Kahoe | 317—103 |
| 2,824,916 | 2/1958 | Steinmayer | 200—50 |

FOREIGN PATENTS

| | | |
|---|---|---|
| 29,270 | 1910 | Great Britain. |
| 857,957 | 1/1961 | Great Britain. |

KATHLEEN H. CLAFFY, *Primary Examiner.*

BERNARD A. GILHEANY, *Examiner.*